(12) United States Patent
Rouleau et al.

(10) Patent No.: US 9,009,923 B2
(45) Date of Patent: Apr. 21, 2015

(54) CUSHION SLEEVE

(75) Inventors: Rodney Rouleau, Manhattan, IL (US); Andrew Crouse, Woodridge, IL (US)

(73) Assignee: Panduit Corp., Tinley Park, IL (US)

( * ) Notice: Subject to any disclaimer, the term of this patent is extended or adjusted under 35 U.S.C. 154(b) by 397 days.

(21) Appl. No.: 13/437,660

(22) Filed: Apr. 2, 2012

(65) Prior Publication Data

US 2013/0255037 A1    Oct. 3, 2013

(51) Int. Cl.
| | | |
|---|---|---|
| *B65D 63/00* | (2006.01) | |
| *B65D 63/10* | (2006.01) | |
| *H02G 3/30* | (2006.01) | |

(52) U.S. Cl.
CPC . *H02G 3/30* (2013.01); *Y10T 24/14* (2015.01); *Y10T 24/1498* (2015.01)

(58) Field of Classification Search
CPC .......... F16L 3/233; F16L 3/137; B65D 63/10; B65D 33/1675; B65D 63/1072; A63B 2005/163; H02G 3/30
USPC ............. 24/16 R, 16 PB, 17 R, 17 AP, 30.5 P
See application file for complete search history.

(56) References Cited

U.S. PATENT DOCUMENTS

| | | | | |
|---|---|---|---|---|
| RE8,679 E | * | 4/1879 | Sheppard | 24/23 R |
| 842,240 A | | 3/1906 | Peck | |
| 834,758 A | * | 10/1906 | Ross | 24/23 B |
| 1,084,407 A | | 1/1914 | Deist | |
| 1,118,222 A | * | 11/1914 | Parks | 24/17 R |
| 2,011,634 A | * | 8/1935 | Hirsh | 24/200 |
| 2,214,436 A | * | 9/1940 | Painter | 24/1 |
| 2,293,562 A | * | 8/1942 | Rosenthal | 24/200 |
| 2,387,295 A | * | 10/1945 | Robertson | 248/74.3 |
| 2,473,209 A | * | 6/1949 | Lombardi | 24/321 |
| 2,618,450 A | * | 11/1952 | Thomas | 248/74.3 |
| 2,840,876 A | | 7/1958 | Bliss | |
| 2,914,827 A | * | 12/1959 | Crammond | 24/23 B |
| 2,936,982 A | * | 5/1960 | Cushenberry | 248/74.3 |
| 2,958,889 A | * | 11/1960 | Greenblatt | 15/187 |
| 2,961,785 A | * | 11/1960 | Toepfer | 40/669 |
| 3,272,471 A | | 9/1966 | McMullah | |
| 3,545,719 A | | 12/1970 | Shulick | |
| 3,588,962 A | * | 6/1971 | Feldberg | 4/16 PB |
| 3,724,456 A | * | 4/1973 | Waxman | 128/877 |
| 3,856,245 A | | 12/1974 | Byerly | |
| 4,107,454 A | | 8/1978 | Jakobsen | |
| 4,189,807 A | * | 2/1980 | Byerly | 24/16 R |
| 4,229,924 A | * | 10/1980 | Teachout, Sr. | 53/399 |
| 4,317,262 A | * | 3/1982 | Wells, Jr. | 24/16 PB |
| 4,318,518 A | * | 3/1982 | Davis | 248/60 |

(Continued)

FOREIGN PATENT DOCUMENTS

GB         2451492 A     2/2009

*Primary Examiner* — Victor Batson
*Assistant Examiner* — Jason W San
(74) *Attorney, Agent, or Firm* — Christopher S. Clancy; James H. Williams (57) ABSTRACT

A cushion sleeve for a cable tie is provided. The cushion sleeve includes a body for receiving a bundle of cables. The body includes a first side and a second side opposite the first side. Additionally, the cushion sleeve includes a first arm extending from the first side of the body along a first axis and a second arm extending from the second side of the body along a second axis. The first axis is oblique to the second axis when the cushion sleeve is unwrapped such that the first arm engages the second arm when the cushion sleeve is wrapped around the bundle of cables.

24 Claims, 10 Drawing Sheets

(56) References Cited

U.S. PATENT DOCUMENTS

| | | | |
|---|---|---|---|
| 4,338,707 A | 7/1982 | Byerly | |
| 4,750,241 A * | 6/1988 | Powell | 24/16 R |
| 4,831,997 A * | 5/1989 | Greene | 124/35.2 |
| 4,841,961 A * | 6/1989 | Burlage et al. | 128/876 |
| 4,862,561 A * | 9/1989 | Lichtenberg | 24/16 PB |
| 4,870,722 A | 10/1989 | Shell, Jr. | |
| 4,912,779 A * | 4/1990 | Laird | 2/12 |
| 5,007,138 A * | 4/1991 | Pritchard et al. | 24/23 B |
| 5,103,534 A * | 4/1992 | Caveney | 24/16 PB |
| 5,230,489 A * | 7/1993 | White et al. | 248/74.2 |
| 5,507,043 A * | 4/1996 | Howe | 2/159 |
| 5,581,850 A * | 12/1996 | Acker | 24/16 PB |
| 5,584,623 A | 12/1996 | Nadherny | |
| 5,655,654 A * | 8/1997 | Broskow | 206/150 |
| 5,718,413 A | 2/1998 | Nagler | |
| 5,746,401 A | 5/1998 | Condon | |
| 5,799,376 A * | 9/1998 | Harsley | 24/16 PB |
| 5,832,568 A * | 11/1998 | Higuchi | 24/30.5 R |
| 6,018,874 A * | 2/2000 | Todd | 30/210 |
| 6,463,827 B1 | 10/2002 | Oetiker | |
| 6,637,130 B2 * | 10/2003 | Urie et al. | 36/11.5 |
| 7,100,248 B2 * | 9/2006 | Crook | 24/16 PB |
| 7,217,201 B2 * | 5/2007 | Sealy | 473/422 |
| 7,340,803 B2 * | 3/2008 | Howell | 24/198 |
| 7,464,442 B2 * | 12/2008 | Laporte | 24/20 R |
| 7,866,005 B2 * | 1/2011 | Vermeer et al. | 24/16 PB |
| 8,191,210 B2 * | 6/2012 | Devers | 24/265 WS |
| 8,474,392 B2 * | 7/2013 | Masters et al. | 114/243 |
| 2003/0041417 A1 * | 3/2003 | Smith | 24/16 R |
| 2003/0167605 A1 * | 9/2003 | Schultz | 24/306 |
| 2004/0031896 A1 | 2/2004 | Heath | |
| 2005/0278901 A1 * | 12/2005 | Huang | 24/16 R |
| 2009/0026236 A1 | 1/2009 | Krause | |
| 2010/0236030 A1 | 9/2010 | Dyer | |
| 2011/0271494 A1 * | 11/2011 | Bellamy et al. | 24/16 R |
| 2012/0180268 A1 * | 7/2012 | Chen | 24/16 R |
| 2012/0180270 A1 * | 7/2012 | Marmelstein | 24/16 R |
| 2012/0210541 A1 * | 8/2012 | Koncelik, Jr. | 24/21 |
| 2014/0283340 A1 * | 9/2014 | Beckman | 24/16 PB |

* cited by examiner

CUSHION SLEEVE

BACKGROUND OF THE INVENTION

The present invention relates to a cushion sleeve for a cable tie, and more particularly, a cushion sleeve for a cable tie installed diagonally about a bundle of cables and an adjacent support member that is affordable and easy to install.

Cushion sleeves for cable ties are well known in the art. For example, existing cushion sleeves, such as Panduit's PCS Cushion Sleeves, are for cable ties, such as Panduit's Pan-Steel® Cable Ties, installed perpendicular to a bundle of cables and parallel to an adjacent support member, such as a rung of a ladder rack. The cushion sleeve protects the bundle of cables from being damaged by the cable ties, for example, during a short circuit event. However, it is difficult to install cable ties in this manner because of variations in rung design, as well as the proximity of other obstructions.

Cable cleats are also well known in the art. For example, existing cable cleats, such as Ellis Patents' Vulcan and Emperor Cable Cleats, provide an alternative to cable ties and cushion sleeves for cable ties. However, cable cleats are expensive and difficult to install because cable cleats typically require additional mounting hardware that has been configured for a specific cable routing system.

Cable ties are more affordable and easier to install than cable cleats because, unlike cable cleats, cable ties do not require any additional mounting hardware, much less additional mounting hardware that has been configured for a specific cable routing system.

Additionally, it is easier to install cable ties diagonally about the bundle of cables and the adjacent support member than perpendicular to a bundle of cables and parallel to an adjacent support member. However, when cable ties are installed in this manner, there is more risk of damage to the bundle of cables because the bundle of cables is exposed to the edges of the cable tie.

Therefore, there is a need for a cushion sleeve for a cable tie installed diagonally about a bundle of cables and an adjacent support member that is affordable and easy to install.

SUMMARY OF THE INVENTION

Certain embodiments of the present invention provide a cushion sleeve for a cable tie. The cushion sleeve includes a body for receiving a bundle of cables. The body includes a first side and a second side opposite the first side. Additionally, the cushion sleeve includes a first arm extending from the first side of the body along a first axis and a second arm extending from the second side of the body along a second axis. The first axis is oblique to the second axis when the cushion sleeve is unwrapped such that the first arm engages the second arm when the cushion sleeve is wrapped around the bundle of cables.

DETAILED DESCRIPTION

FIGS. 1-9 illustrate a cushion sleeve 100 for a cable tie 10, such as Panduit's Pan-Steel® Cable Ties, installed diagonally about a bundle 20 of cables 30 and an adjacent support member 40, such as a rung of a ladder rack, according to several embodiments of the present invention.

Figure 1A:
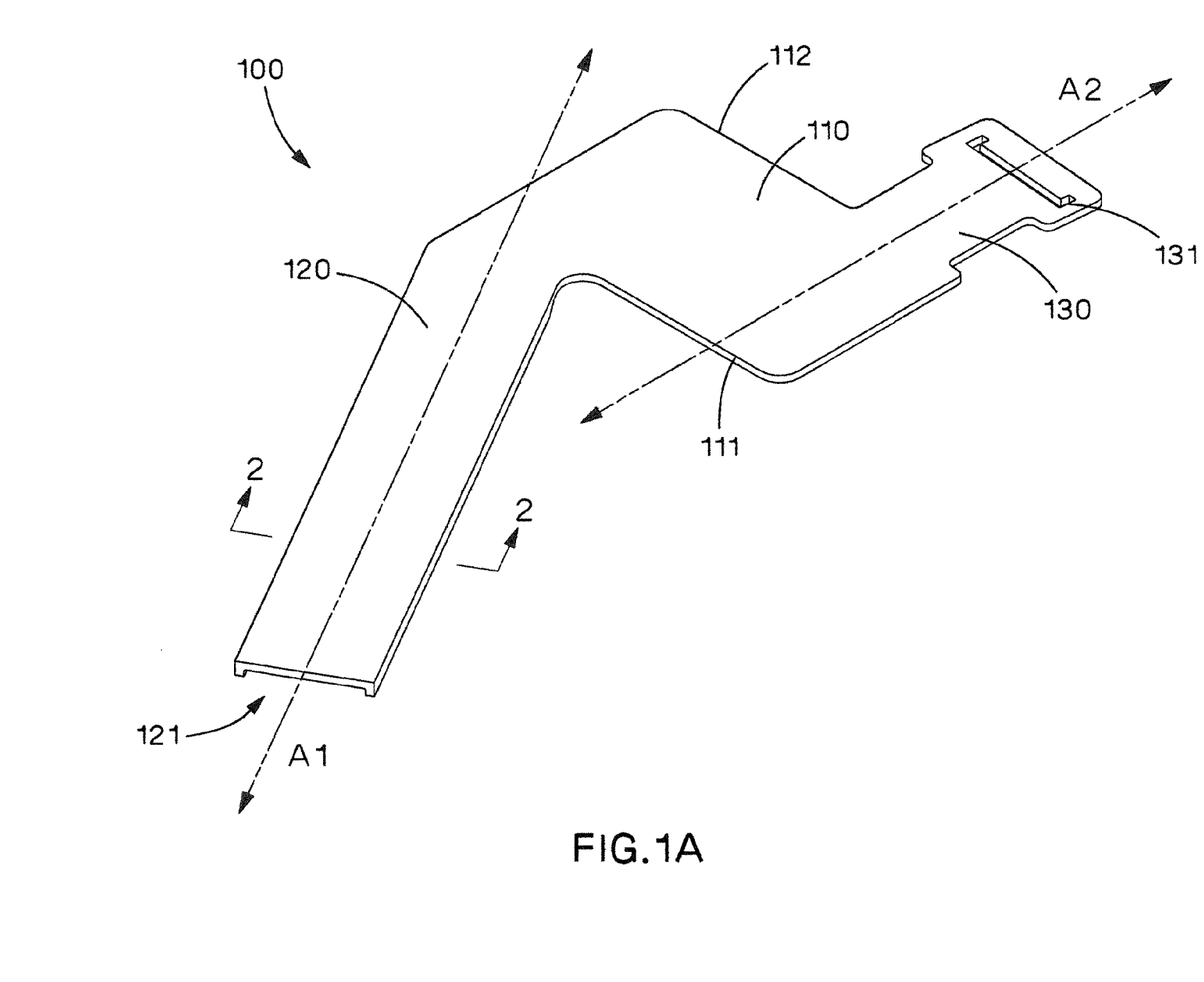
FIG. 1A is first side perspective view of a cushion sleeve for a cable tie installed diagonally about a bundle of cables and an adjacent support member according to an embodiment of the present invention.

As shown in FIG. 1A, the cushion sleeve 100 includes a body 110 for receiving a bundle 20 of cables 30. The body 110 includes a first side 111 and a second side 112 opposite the first side 111. Preferably, the body 110 is rectangular, but it is likewise contemplated that the body 110 is elliptical or any other suitable shape for receiving the bundle 20 of cables 30.

Additionally, as shown in FIG. 1A, the cushion sleeve 100 includes a first arm 120 extending from the first side 111 of the body 110 along a first axis A1 and a second arm 130 extending from the second side 112 of the body 110 along a second axis A2. The first axis A1 is oblique to the second axis A2 when the cushion sleeve 100 is unwrapped such that the first arm 120 engages the second arm 130 when the cushion sleeve 100 is wrapped around the bundle 20 of cables 30.

Figure 1B:
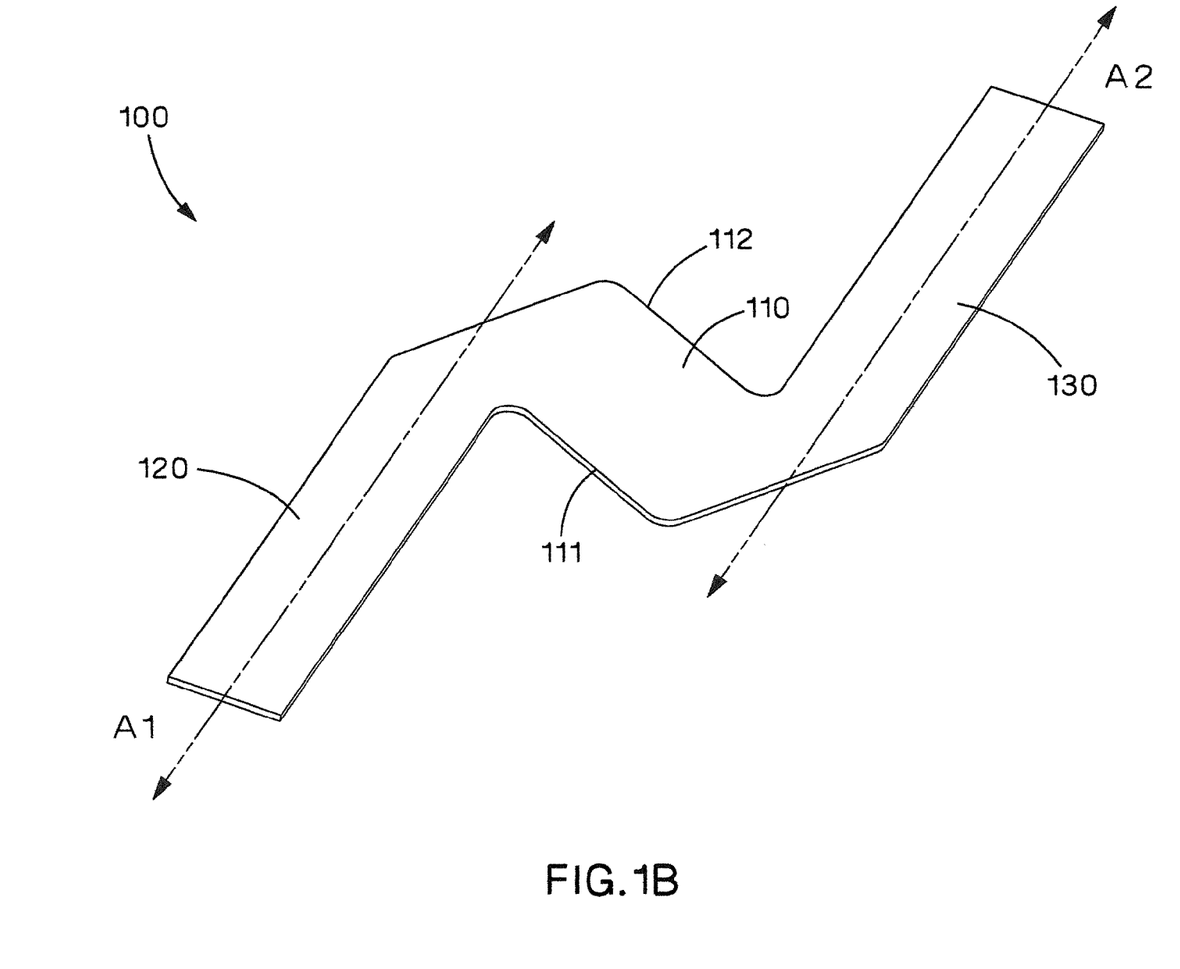
FIG. 1B is first side perspective view of a cushion sleeve for a cable tie installed diagonally about a bundle of cables and an adjacent support member according to an alternative embodiment of the present invention.
Figure 2A:
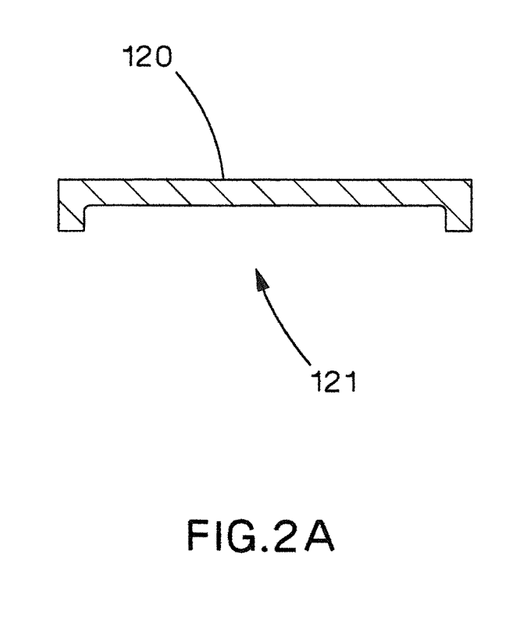
FIG. 2A is a cross-sectional view taken along line 2-2 of FIG. 1, showing a U-shaped channel for receiving the cable tie.
Figure 2B:
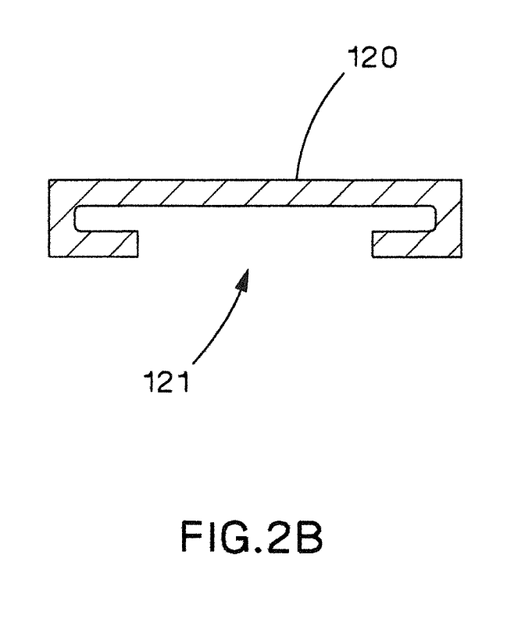
FIG. 2B is a cross-sectional view similar to the cross-sectional view of FIG. 2A, showing a C-shaped channel for receiving the cable tie according to an alternative embodiment of the present invention.

Alternatively, as shown in FIG. 1B, the first axis A1 is oblique to the first side and parallel to the second axis A2 when the cushion sleeve 100 is unwrapped such that the first arm 120 engages the second arm 130 when the cushion sleeve 100 is wrapped around the bundle 20 of cables 30.

As shown in FIG. 1A, the first arm 120 includes a channel 121 for receiving the cable tie 10. Preferably, the channel is U-shaped (FIG. 2A), but it is likewise contemplated that the channel 121 is C-shaped (FIG. 2B) or any other suitable shape for receiving the cable tie 10.

Additionally, as shown in FIG. 1A, the second arm 130 includes an opening 131 for receiving the first arm 120 and releasably connecting the first arm 120 to the second arm 130. Preferably, the shape of the opening 131 corresponds to the shape of the channel 121. For example, as shown in FIG. 1A, the opening 131 is U-shaped, but it is likewise contemplated that the opening 131 is C-shaped or any other suitable shape corresponding to the shape of the channel 121.

Figure 3:
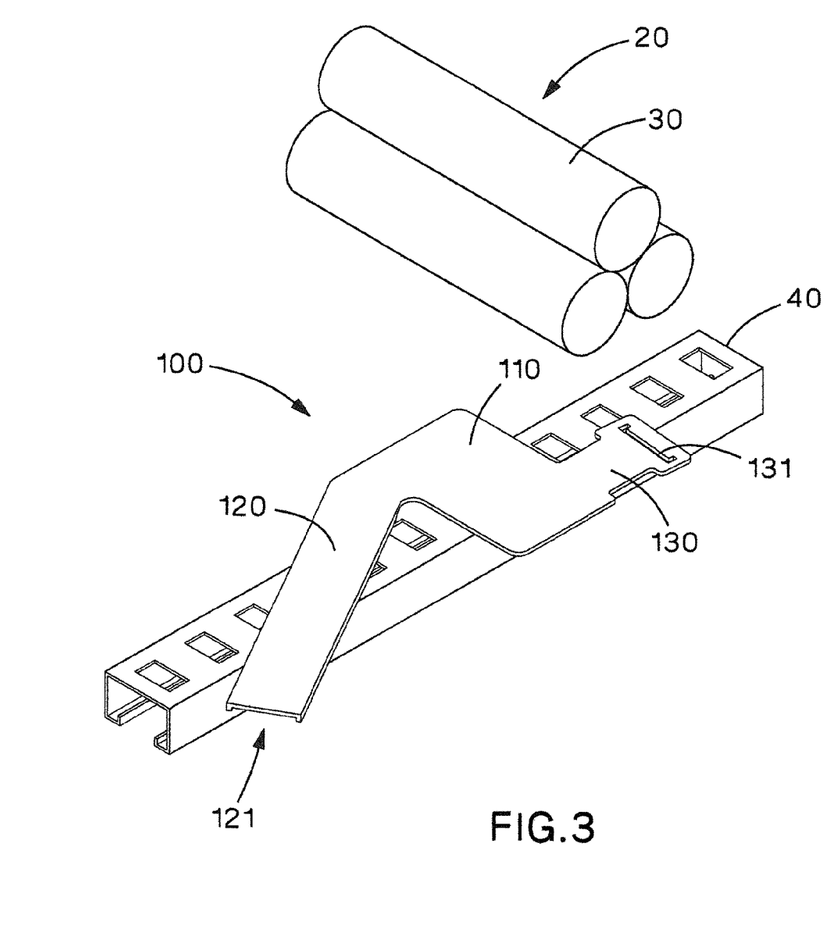
FIG. 3 is a first side perspective view of the cushion sleeve of FIG. 1, showing the cushion sleeve positioned on the support member.

As shown in FIG. 3, the cushion sleeve 100 is positioned on the support member 40.

Figure 4:
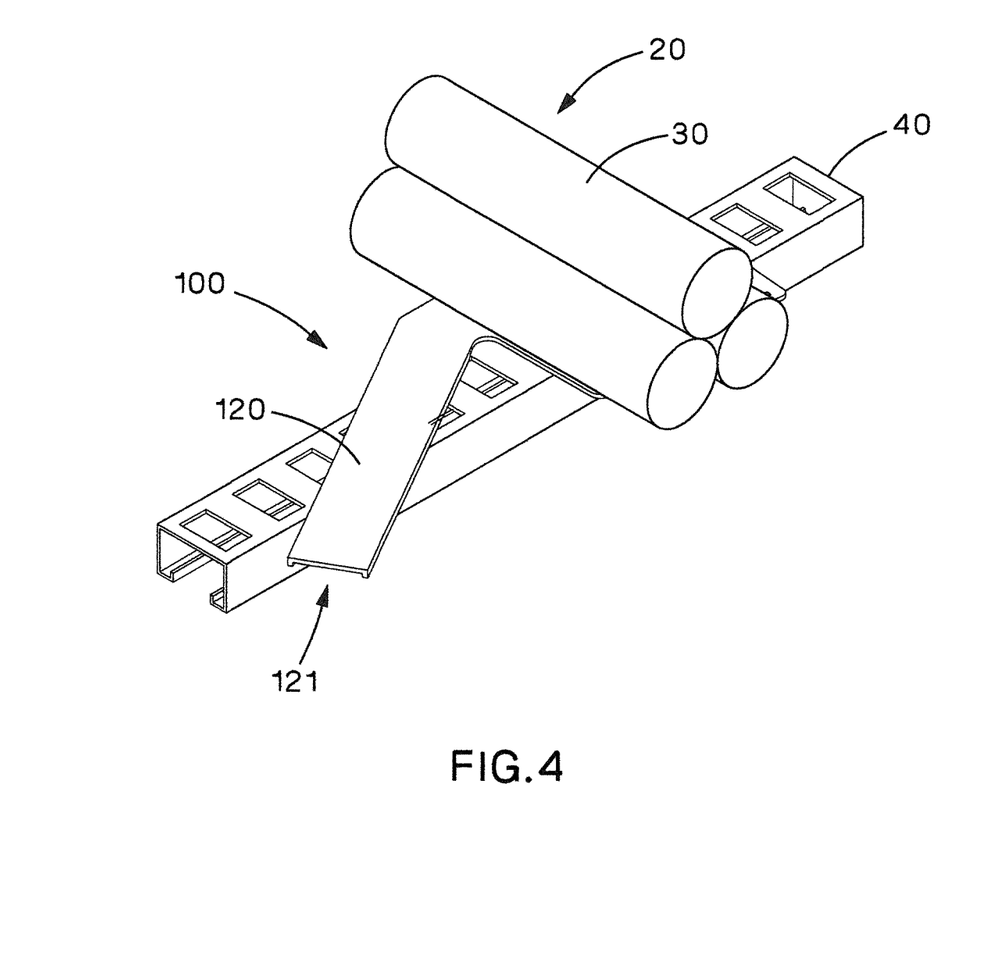
FIG. 4 is a first side perspective view of the cushion sleeve of FIG. 1, showing the bundle of cables positioned on a body of the cushion sleeve.

As shown in FIG. 4, the bundle 20 of cables 30 is positioned on the body 110 of the cushion sleeve 100.

Figure 5:
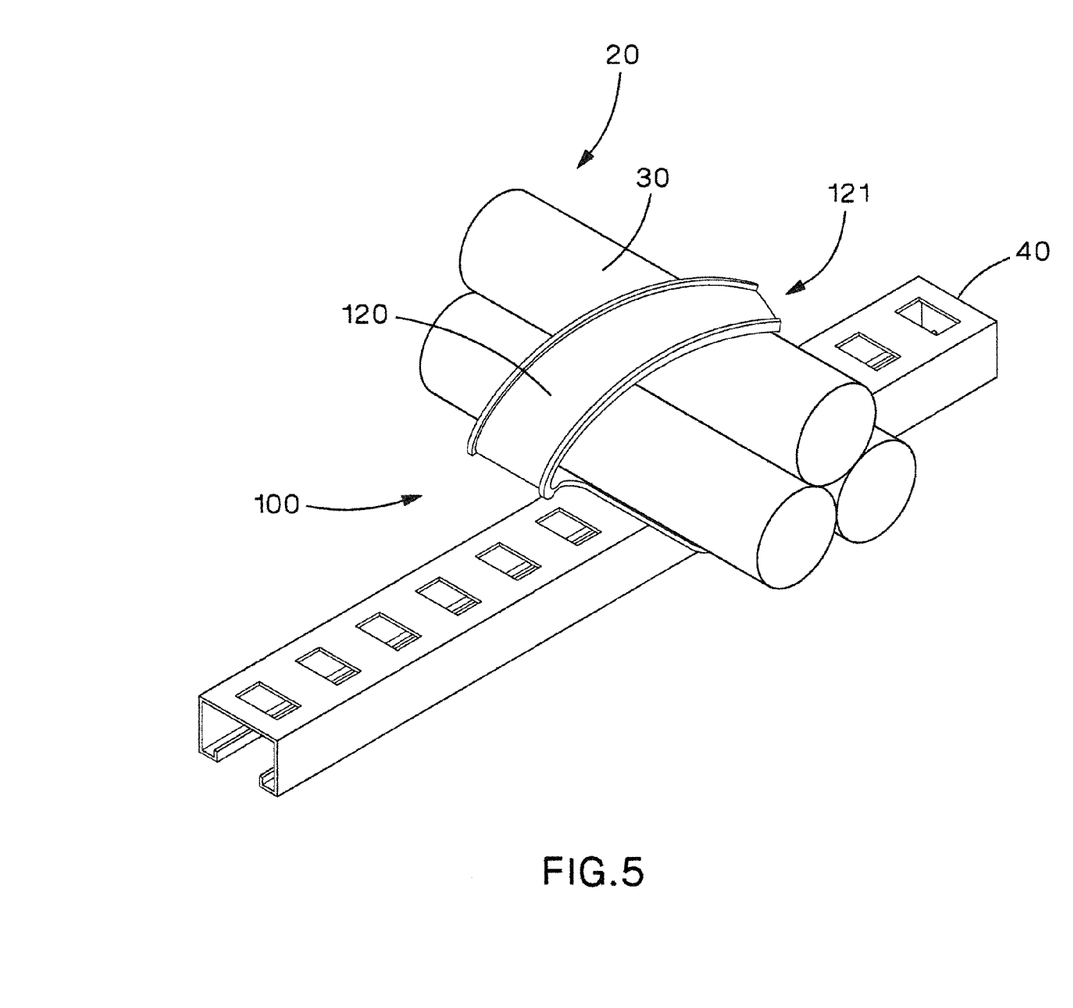
FIG. 5 is a first side perspective view of the cushion sleeve of FIG. 1, showing a first arm positioned around the bundle of cables.

As shown in FIG. 5, the first arm 120 of the cushion sleeve 100 is wrapped around the bundle 20 of cables 30.

Figure 6:
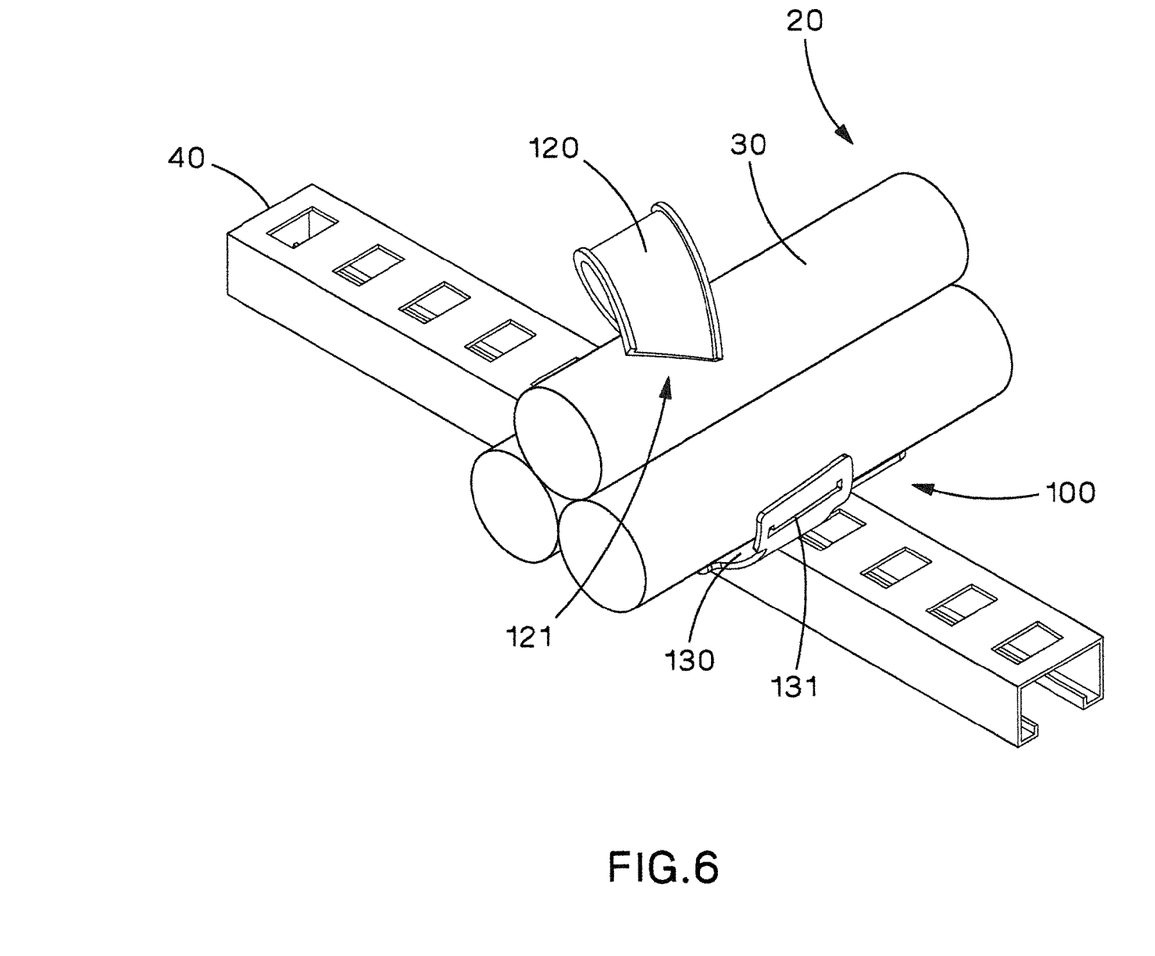
FIG. 6 is a second side perspective view of the cushion sleeve of FIG. 1, showing a second arm positioned around the bundle of cables.

As shown in FIG. 6, the second arm 130 of the cushion sleeve 100 is wrapped around the bundle 20 of cables 30.

Figure 7:
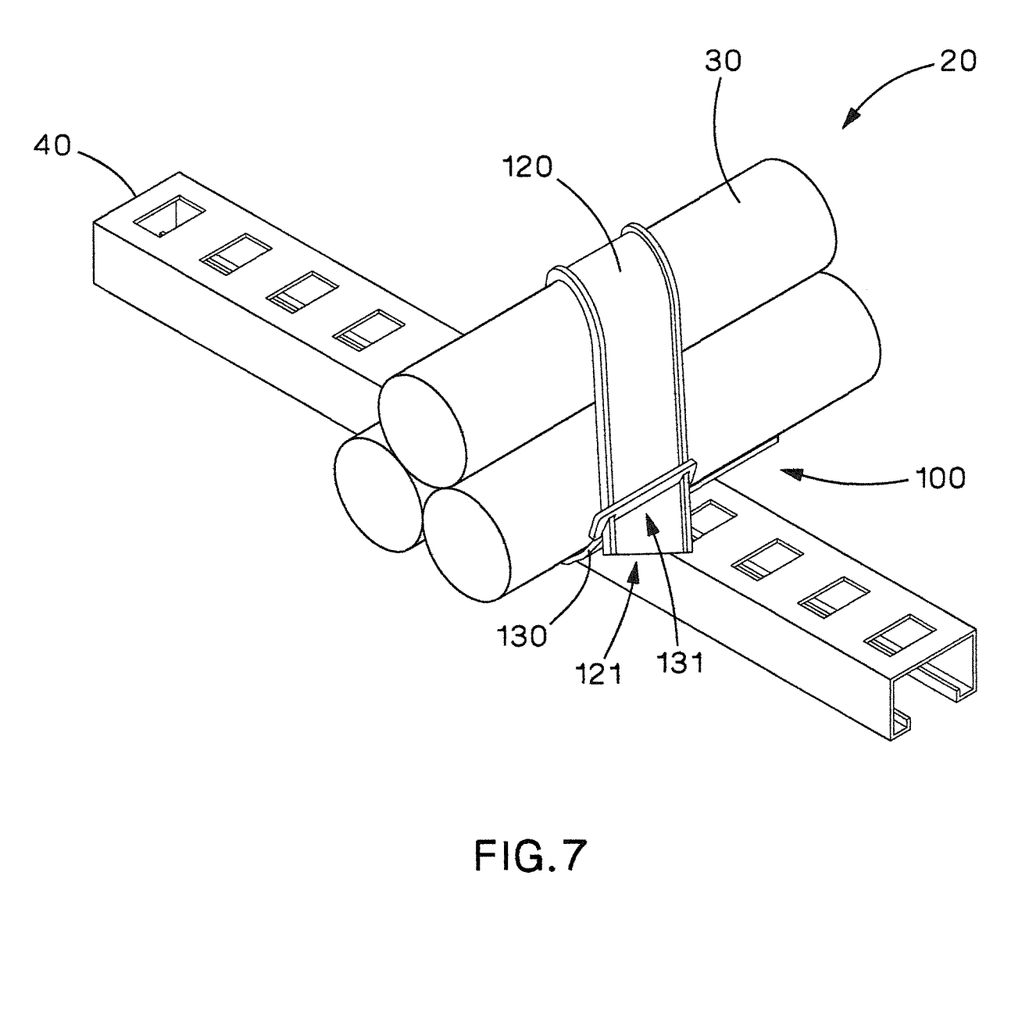
FIG. 7 is a second side perspective view of the cushion sleeve of FIG. 1, showing the cushion sleeve secured around the bundle of cables.

As shown in FIG. 7, the first arm 120 of the cushion sleeve 100 engages the second arm 130 of the cushion sleeve 100. More particularly, the opening 131 in the second arm 130 of the cushion sleeve 100 receives the channel 121 of the first arm 120 of the cushion sleeve 100 and releasably connects the first arm 120 of the cushion sleeve 100 to the second arm 130 of the cushion sleeve 100.

Figure 8:
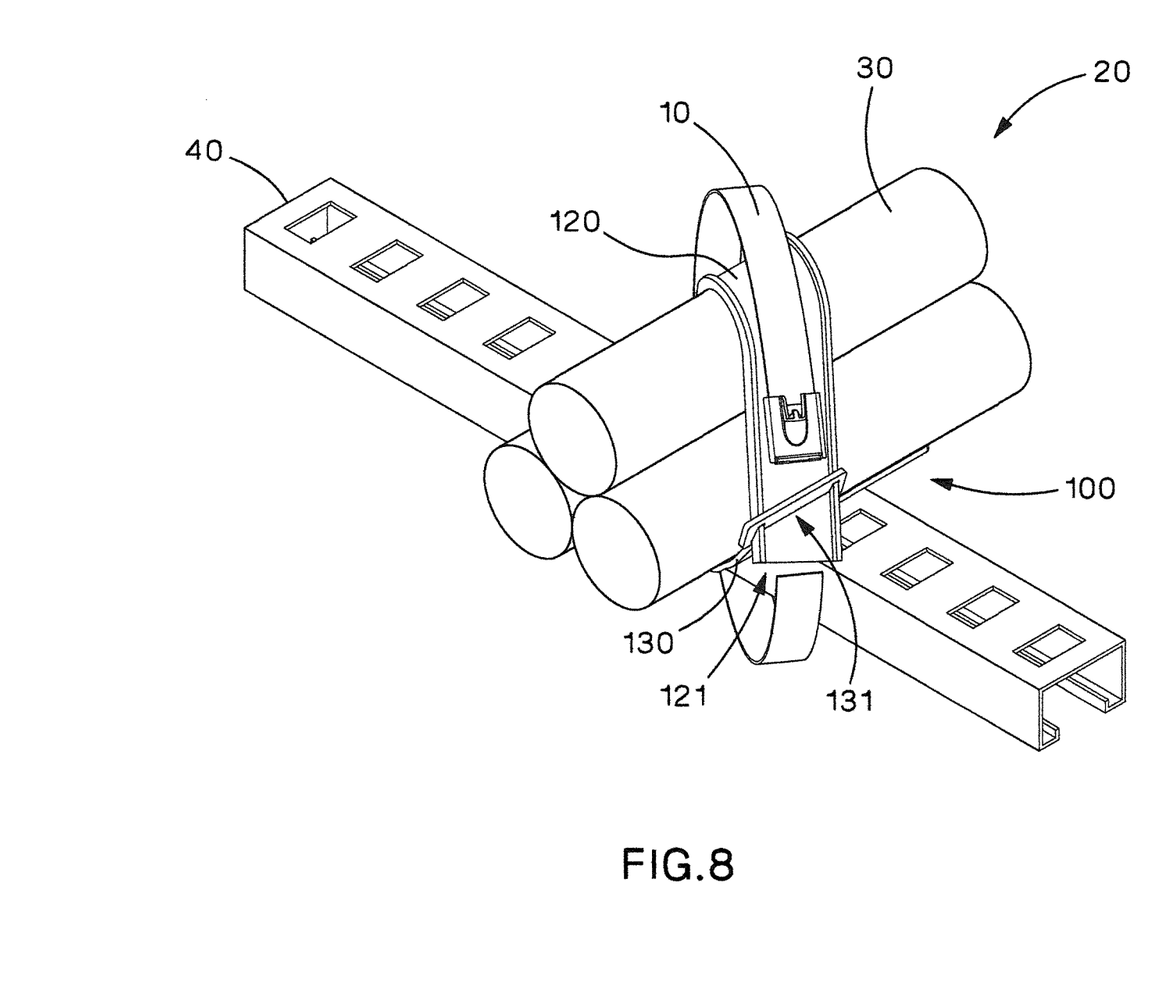
FIG. 8 is a second side perspective view of the cushion sleeve of FIG. 1, showing the cable tie positioned around the cushion sleeve, the bundle of cables, and the support member.

As shown in FIG. 8, the cable tie 10 is installed diagonally about the bundle 20 of cables 30 and the support member 40. The cable tie 10 is single-looped, but it is likewise contemplated that the cable tie 10 is multi-looped, for example, double-looped or triple-looped, to further increase the strength of the connection.

Figure 9:
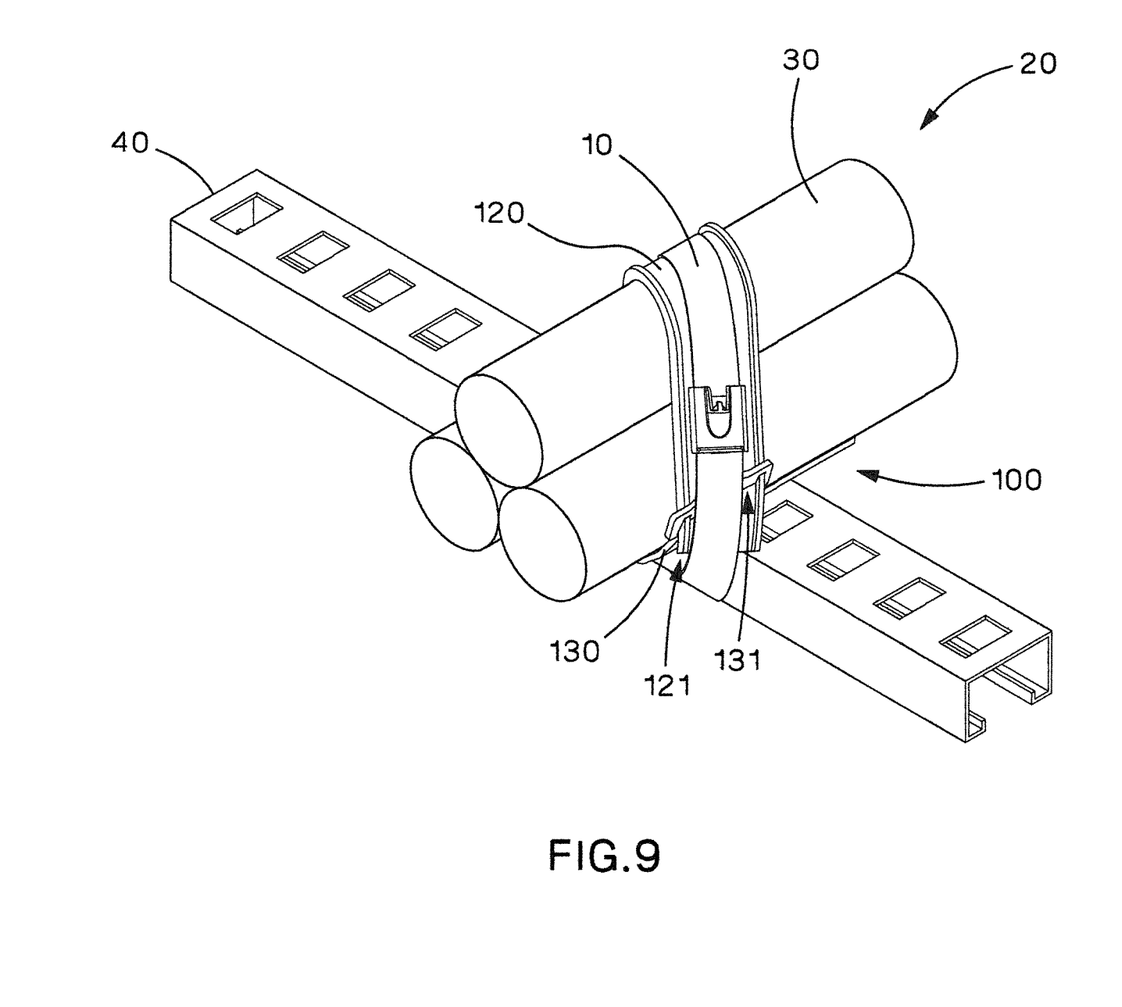
FIG. 9 is a second side perspective view of the cushion sleeve of FIG. 1, showing the cable tie secured around the cushion sleeve, the bundle of cables, and the support member.

As shown in FIG. 9, the channel 121 receives the cable tie 10 when the cable tie 20 is secured around the cushion sleeve 100, the bundle 20 of cables 30, and the support member 40.

While this invention has been described in conjunction with the exemplary embodiments outlined above, various alternatives, modifications, variations, and/or improvements, whether known or presently unforeseen, may become apparent. Accordingly, the exemplary embodiments of the invention as set forth above are intended to be illustrative, not limiting. Various changes may be made without departing from the spirit and scope of the invention.

The invention claimed is:

1. A cushion sleeve comprising:
a body receiving a bundle of cables, the body disposed between the bundle of cables and a support member, the body having a first side and a second side spaced apart from the first side, the body receiving the bundle of cables along a body axis, the body axis disposed between the first side and the second side and parallel to a longitudinal axis of the bundle of cables;
a first arm disposed about the bundle of cables and between the bundle of cables and a cable tie, the first arm integrally formed with the body and extending from the first side of the body along a first arm axis; and
a second arm disposed about the bundle of cables and between the bundle of cables and the cable tie, the second arm integrally formed with the body and extending from the second side of the body along a second arm axis,
wherein, when the cushion sleeve is laid flat entirely in a single plane, the first arm axis is oblique relative to the body axis and the second arm axis such that, when the cushion sleeve is disposed about the bundle of cables, the first arm engages the second arm.

2. The cushion sleeve of claim 1, wherein the first arm includes a channel for receiving the cable tie.

3. The cushion sleeve of claim 2, wherein the channel is U-shaped.

4. The cushion sleeve of claim 2, wherein the channel is C-shaped.

5. The cushion sleeve of claim 1, wherein the second arm includes an opening for receiving the first arm.

6. The cushion sleeve of claim 5, wherein the opening releasably connects the first arm to the second arm.

7. The cushion sleeve of claim 5, wherein the opening is U-shaped.

8. The cushion sleeve of claim 5, wherein the opening is C-shaped.

9. A cushion sleeve comprising:
a body receiving a bundle of cables, the body disposed between the bundle of cables and a support member, the body having a first side and a second side spaced apart from the first side, the body receiving the bundle of cables along a body axis, the body axis disposed between the first side and the second side and parallel to a longitudinal axis of the bundle of cables;
a first arm disposed about the bundle of cables and between the bundle of cables and a cable tie, the first arm integrally formed with the body and extending from the first side of the body along a first arm axis; and
a second arm disposed about the bundle of cables and between the bundle of cables and the cable tie, the second arm integrally formed with the body and extending from the second side of the body along a second arm axis,
wherein, when the cushion sleeve is laid flat entirely in a single plane, the first arm axis is oblique relative to the body axis and parallel to the second arm axis such that, when the cushion sleeve is disposed about the bundle of cables, the first arm engages the second arm.

10. The cushion sleeve of claim 9, wherein the first arm includes a channel for receiving the cable tie.

11. The cushion sleeve of claim 10, wherein the channel is U-shaped.

12. The cushion sleeve of claim 10, wherein the channel is C-shaped.

13. The cushion sleeve of claim 9, wherein the second arm includes an opening for receiving the first arm.

14. The cushion sleeve of claim 13, wherein the opening releasably connects the first arm to the second arm.

15. The cushion sleeve of claim 13, wherein the opening is U-shaped.

16. The cushion sleeve of claim 13, wherein the opening is C-shaped.

17. A cushion sleeve comprising:
a body receiving a bundle of cables, the body disposed between the bundle of cables and a support member, the body having a first side and a second side spaced apart from the first side, the body receiving the bundle of cables along a body axis, the body axis disposed between the first side and the second side and parallel to a longitudinal axis of the bundle of cables;
a first arm disposed about the bundle of cables and between the bundle of cables and a cable tie, the first arm integrally formed with the body and extending from the first side of the body along a first arm axis, the first arm having a cross-sectional shape; and
a second arm disposed about the bundle of cables and between the bundle of cables and the cable tie, the second arm integrally formed with the body and extending from the second side of the body along a second arm axis, the second arm having a corresponding cross-sectional opening for receiving the first arm with the cross-sectional shape,
wherein, when the cushion sleeve is laid flat entirely in a single plane, the first arm axis is oblique relative to the body axis and the second arm axis such that, when the cushion sleeve is disposed about the bundle of cables, the first arm is releasably connected to the second arm via the opening to secure the bundle of cables.

18. The cushion sleeve of claim 17, wherein the first arm includes a channel for receiving the cable tie.

19. The cushion sleeve of claim 18, wherein the channel is U-shaped.

20. The cushion sleeve of claim 18, wherein the channel is C-shaped.

21. The cushion sleeve of claim 19, wherein the opening is U-shaped.

22. The cushion sleeve of claim 20, wherein the opening is C-shaped.

23. The cushion sleeve of claim 17, wherein the opening is U-shaped.

24. The cushion sleeve of claim 17, wherein the opening is C-shaped.

* * * * *